Dec. 4, 1962     E. H. BUCHANAN ETAL     3,066,484
GAS FLOW CONTROL ROCKET MOTOR DEVICE
Filed April 10, 1961
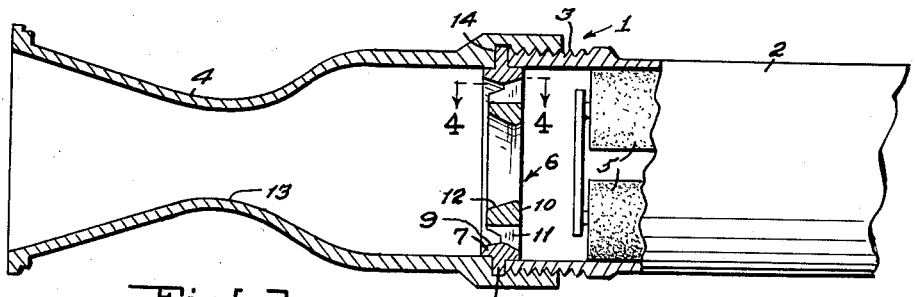
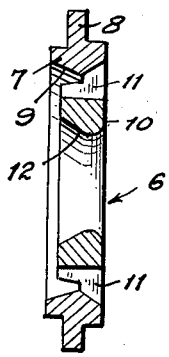
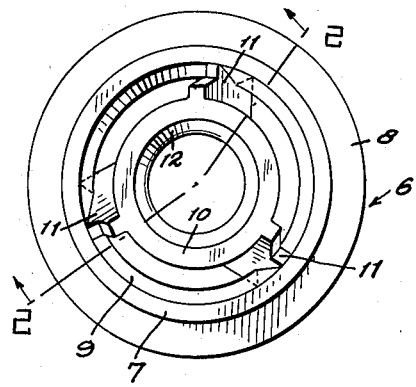
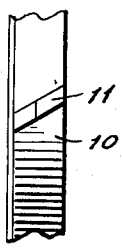
INVENTORS,
E. H. Buchanan
BY    E. W. Thompson
S. J. Rotondi & A. J. Dupont

United States Patent Office 3,066,484
Patented Dec. 4, 1962

3,066,484
GAS FLOW CONTROL ROCKET MOTOR DEVICE
Earl H. Buchanan, Dover, and Emil W. Thompson, Succasunna, N. J., assignors to the United States of America as represented by the Secretary of the Army
Filed Apr. 10, 1961, Ser. No. 102,073
2 Claims. (Cl. 60—35.6)
(Granted under Title 35, U.S. Code (1952), sec. 266)

The invention described herein may be manufactured and used by or for the Government for governmental purposes without the payment to us of any royalty thereon.

This invention relates to a gas flow control rocket motor device, and more particularly to a device to control the gas flow ahead of the nozzle of a rocket motor to eliminate mal thrust.

Previous tests have shown that there was a wide dispersion in flight firings of rockets of the solid propellant type at low temperatures which could not be related to asymmetries in the metal parts of the rocket. It was observed that upon examining rounds after firing, there were three distinct marks on the expansion cone of the nozzle which correspond in orientation of the three grain charge.

It was believed that there was a direct connection between the wide dispersion of the rounds and the markings on the cone, since these markings were, in some cones, asymmetrical. In addition, study of high speed motion pictures of the pattern of the exhaust gases in relatively long burning rockets, indicated what appeared to be shocks randomly distributed around the thrust axis and extending into the exhaust cone of the nozzle to cause mal thrust of the rocket.

The present invention is designed to eliminate or minimize mal thrust by two means. First, the gas flow is controlled by controlling velocity and pressure of the gases upstream of the nozzle, utilizing the principles of the nozzle design of the invention. Secondly, the principle of rotating missiles to average out minor asymmetries of metal parts is applied to the gases by vanes which are utilized to attain this end.

It is, therefore, a primary object of this invention to control the gas flow ahead of the nozzle of a solid propellant rocket motor in order to eliminate mal thrust in the rocket and uneven erosion on the nozzle.

It is another object that the device be small in size in order that the rocket motor will not be lengthened to any appreciable degree.

A further object is that the device be light in weight so that it will not offset the inherent weight advantage of the round.

A still further object is that the device be simple of construction and cheap to manufacture.

The specific nature of the invention as well as other objects and advantages thereof, will clearly appear from a description of a preferred embodiment such as shown in the accompanying drawing in which:

FIG. 1 is an axial section taken through a portion of the tail section of a rocket motor and showing the control device of the invention assembled therein;

FIG. 2 is a cross section of the control device taken along line 2—2 of FIG. 3;

FIG. 3 is a rear view of the control device; and,

FIG. 4 is an end view of one of the vanes on the inner ring looking in a plane taken along line 4—4 of FIG. 1.

Referring now to the drawings, reference character 1 indicates generally a tail portion of a rocket motor which has a motor body 2 to which there is secured by a threaded engagement 3, a nozzle 4. Solid propellant increments are indicated by 5.

The flow control device of the invention is indicated generally by 6 and consists of an outer ring 7 which is provided with an annular flange 8 for assembly in the rocket motor as seen in FIG. 1. Outer ring 7 has a nozzle portion 9. An inner ring 10 is secured to the inner peripheral surface of outer ring 7 by three convergent rotation vanes 11. Inner ring 10 is also provided with a nozzle portion 12.

The flow device 6 is positioned in the rocket motor combustion chamber one inch up stream of the convergent section of the nozzle 4. The port area of the device is fixed at 1.5 that of the throat 13 of nozzle 4 and .6 that of the port area of the grain 5 in order to build up a positive pressure across the device.

In assembly, the device 6 is placed in its position in the nozzle portion 4 with the annular flange 8 abutting a shoulder 14 formed in nozzle portion 4. The motor body 2 is then screwed into the nozzle portion and secures the device 6 therebetween.

From FIGS. 3 and 4, it will be seen that the vanes 11 are canted and act to remove or average out irregularities in the gas flow before it reaches the throat 13 of the nozzle and to rotate the rocket.

The gas flow is slowed to increase its density around the outer perimeter of the gas chamber wall of the motor as compared to the high velocity and less dense gas flow down its center and this is accomplished by the two nozzles 9 and 12 on rings 7 and 10 respectively.

It is apparent from the foregoing, that a novel flow control device has been devised that regulates the flow of gases to and through the nozzle of a rocket motor to insure uniform gas flow and eliminate mal thrust and uneven erosion on the nozzle walls. The device also imparts spin to the rocket by the vanes and baffles upstream from the nozzle. The device is applicable to all free flight solid propellant rockets for improving their accuracy.

Variations and modifications may be effected without departing from the scope of the novel concept of the present invention.

What is claimed is:

1. In combination, a rocket motor including a nozzle portion, a detachable motor body portion and a propellant in said motor body, a gas flow control device secured between said nozzle portion and said motor body portion, said gas flow control device comprising an outer ring having an outer annular flange integral thereon for securing said control device between said nozzle portion and said motor portion, an inner ring and a plurality of canted integral rotation vanes between the outer circumferential surface of said inner ring and the inner peripheral surface of said outer ring.

2. In a gas flow control device as claimed in claim 1 wherein said device is secured in said rocket motor whereby it is spaced between the convergent section of said nozzle portion and the propellant of the rocket.

References Cited in the file of this patent

UNITED STATES PATENTS

| 2,489,953 | Burney | Nov. 29, 1949 |
| 2,661,692 | Vegren | Dec. 8, 1953 |
| 2,670,596 | Whitworth | Mar. 2, 1954 |
| 2,741,085 | Prentiss | Apr. 10, 1956 |

FOREIGN PATENTS

| 676,368 | Great Britain | July 23, 1952 |